(12) United States Patent
Calnan et al.

(10) Patent No.: US 8,881,291 B2
(45) Date of Patent: Nov. 4, 2014

(54) SYSTEM AND METHOD FOR INHIBITING THE PROCESSING OF NEW CODE MODULES BY AN OUTDATED RUNTIME ENVIRONMENT

(71) Applicant: Apple Inc., Cupertino, CA (US)

(72) Inventors: Roger S. Calnan, Palo Alto, CA (US); Jeannette Hung, Menlo Park, CA (US); Aurelio Garcia-Ribeyro, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 66 days.

(21) Appl. No.: 13/626,258

(22) Filed: Sep. 25, 2012

(65) Prior Publication Data

US 2014/0090063 A1    Mar. 27, 2014

(51) Int. Cl.
*G06F 21/00* (2013.01)
*G06F 9/44* (2006.01)

(52) U.S. Cl.
CPC ...................................... *G06F 8/68* (2013.01)
USPC .............................................. 726/25; 726/22

(58) Field of Classification Search
CPC .............. G06F 8/65; G06F 8/67; G06F 8/68; G06F 11/1433; G06F 8/60; G06F 21/577; H04L 63/1408
USPC ............................................................ 726/25
See application file for complete search history.

(56) References Cited

U.S. PATENT DOCUMENTS

| | | | |
|---|---|---|---|
| 8,171,141 B1 | 5/2012 | Offer et al. | |
| 8,347,263 B1 | 1/2013 | Offer | |
| 8,464,240 B2 | 6/2013 | Fritsch et al. | |
| 8,555,272 B2 | 10/2013 | Wetherly et al. | |
| 8,577,937 B1 | 11/2013 | Offer | |
| 2002/0143795 A1* | 10/2002 | Fletcher et al. | 707/200 |
| 2004/0044629 A1* | 3/2004 | Rhodes et al. | 705/59 |
| 2005/0160352 A1* | 7/2005 | Chung et al. | 715/500.1 |
| 2005/0188419 A1* | 8/2005 | Dadhia et al. | 726/1 |
| 2008/0077913 A1* | 3/2008 | Ahn et al. | 717/170 |

* cited by examiner

*Primary Examiner* — Yogesh Paliwal
(74) *Attorney, Agent, or Firm* — Meyertons Hood Kivlin Kowert & Goetzel

(57) ABSTRACT

A system and method for inhibiting some code modules from being processed by an outdated runtime environment are disclosed. The system and method may operate to detect that a runtime environment installed on a computer system is outdated. New code modules that have not been previously processed by the runtime environment may be inhibited from being processed by the outdated runtime environment, while known code modules that have been previously processed may be allowed to continue being processed uninhibitedly by the outdated runtime environment.

18 Claims, 6 Drawing Sheets

SYSTEM AND METHOD FOR INHIBITING THE PROCESSING OF NEW CODE MODULES BY AN OUTDATED RUNTIME ENVIRONMENT

BACKGROUND OF THE INVENTION

1. Field of the Invention

This invention relates generally to the field of computer software, and more particularly, to a system and method for inhibiting the processing of new code modules by an outdated runtime environment.

2. Description of the Related Art

Many computer users have runtime environments installed on their computer systems for executing or processing various kinds of code modules. For example, a Java Runtime Environment is used to execute Java™ code modules. It is common for users of computer systems such as desktops, tablets, or phones to download and execute code modules from websites in order to run applications such as games, file uploaders, banking apps, etc.

The code modules processed by a runtime environment are often downloaded from potentially unsafe sources. Malicious parties often try to disguise malicious code modules as legitimate ones. An unsuspecting user may download a malicious code module which, when executed by the runtime environment, installs a virus or performs other malicious operations on the user's computer system. Malicious code modules often exploit security vulnerabilities in the runtime environment to perform their malicious operations.

Another problem associated with the execution of code modules in a runtime environment is that the runtime environment may not be completely stable or bug-free. Even if a code module is legitimate, the code module may not execute correctly if the runtime environment has stability problems.

The developer of a runtime environment can attempt to address these issues by periodically providing updates to the runtime environment to fix known security vulnerabilities and stability issues. However, this may not solve the problem completely because users may not upgrade to the new version of the runtime environment when informed that it is available.

SUMMARY

Various embodiments of a system and method for inhibiting some code modules from being processed by an outdated runtime environment are disclosed. The system and method may operate to detect that a runtime environment installed on a computer system is outdated. In response to determining that a first code module was previously processed by the runtime environment prior to the runtime environment becoming outdated, the system and method may allow the first code module to be processed by the runtime environment. In response to determining that a second code module has not been previously processed by the runtime environment prior to the runtime environment becoming outdated, the system and method may inhibit the second code module from being processed by the runtime environment.

In various embodiments, inhibiting the second code module from being processed may include performing any action to block or delay the second code module from being processed by the runtime environment and/or performing any action that requires a response from the user to authorize the second code module to be processed. In some embodiments the system and method may inhibit the second code module from being processed by prompting for user input to authorize the second code module to be processed by the runtime environment. In other embodiments the system and method may inhibit the second code module from being processed by automatically blocking the second code module from being processed by the runtime environment.

The system and method may detect that the runtime environment installed on the computer system is outdated in various ways. In some embodiments the system and method may detect that the runtime environment is outdated by determining that a newer version of the runtime environment is available. In other embodiments the system and method may detect that the runtime environment is outdated by determining that an expiration date of the runtime environment installed on the computer system has passed.

The system and method may use various techniques to determine that the first code module was previously processed by the runtime environment prior to the runtime environment becoming outdated. For example, in some embodiments the system and method may determine that the first code module was stored in a cache associated with the runtime environment prior to the runtime environment becoming outdated. In other embodiments the system and method may determine that the first code module has a checksum or other identifier that is identical to or equivalent to an identifier of a code module previously processed by the runtime environment. In other embodiments the system and method may determine that the first code module was downloaded from a location identical to a location from which a code module previously processed by the runtime environment was downloaded.

In further embodiments the system and method may allow the runtime environment to process a third code module that has not been previously processed by the runtime environment without inhibiting the processing of the third code module in response to determining that the third code module has one or more attributes designating the third code module as a safe code module.

In further embodiments the system and method may operate to analyze the second code module to determine whether the second code module is configured to perform one or more operations indicated as being security risks. The system and method may inhibit the second code module from being processed by the runtime environment in response to both determining that the second code module has not been previously processed by the runtime environment prior to the runtime environment becoming outdated and determining that the second code module is configured to perform one or more operations indicated as being security risks.

In various embodiments the runtime environment may be any kind of runtime environment, and the code modules may be any kind of code modules. In some embodiments the runtime environment may be configured to execute bytecode for a virtual machine, and the first code module and the second code module may include bytecode for the virtual machine. In other embodiments the runtime environment may be configured to manage execution of native code compiled for a physical processor, and the first code module and the second code module may include native code compiled for the physical processor. In other embodiments the runtime environment may be configured to process markup language code, and the first code module and the second code module include markup language code. In other embodiments the runtime environment may be configured to process code implementing multimedia content, and the first code module and the second code module may include code implementing multimedia content.

BRIEF DESCRIPTION OF THE DRAWINGS

A better understanding can be obtained when the following detailed description is considered in conjunction with the following drawings, in which.

Figure 1:
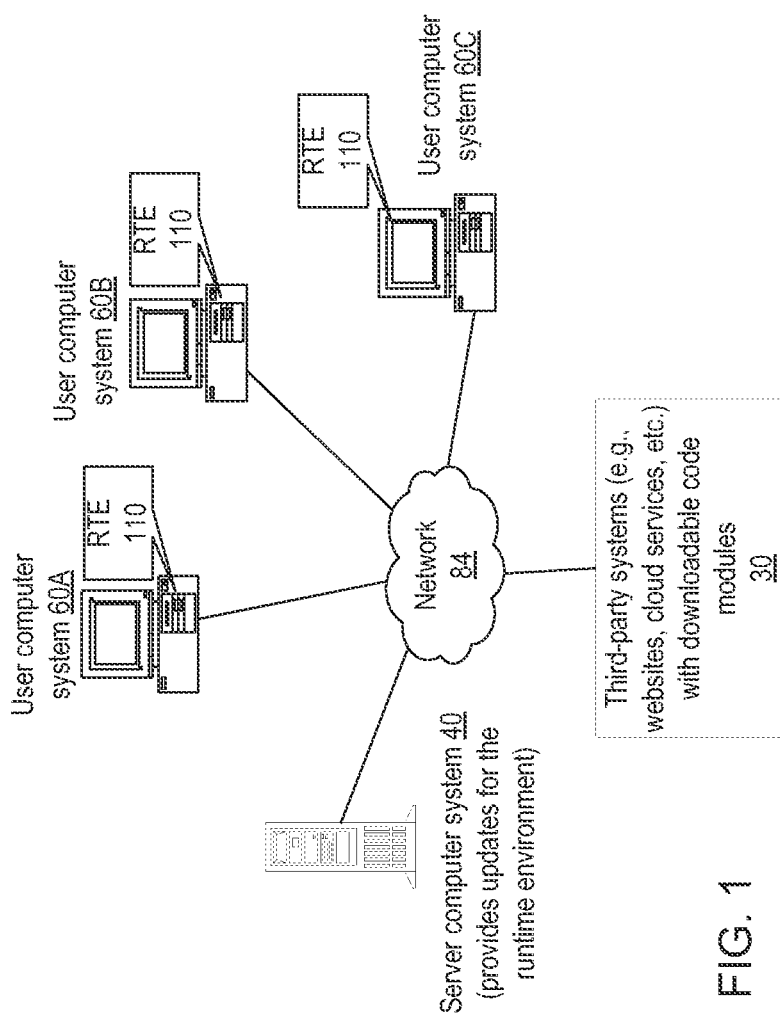
FIG. 1 illustrates a plurality of user computer systems coupled to a server computer system from which a runtime environment can be downloaded and also coupled to one or more third-party systems from which code modules for the runtime environment can be downloaded.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a system and method for inhibiting some code modules from being processed by an outdated runtime environment are disclosed. As used herein, the term "runtime environment" may refer to any software application configured to execute, run, or process code modules. The term "code module" may refer to any information that includes program instructions and/or data for implementing a particular function or application. A code module may be stored as a component, e.g., in the form of one or more files, which the associated runtime environment is configured to process or execute. For example, the one or more files of the code module may be structured according to a particular specification or file format that can be processed by the runtime environment.

A code module may include either program instructions or data or any combination of the two. In some embodiments, a code module may include various kinds of program instructions or code, such as bytecode (e.g., code compiled for execution on a virtual machine), native executable code (e.g., code compiled for execution on a physical processor), programming language code (e.g., text and/or graphical code written in a particular programming language or written for a particular programming platform), scripting code (e.g., code written in a scripting language), markup language code (e.g., code written in a markup language such as HTML, XML, etc.), multimedia presentation code (e.g., code written according to a particular specification for implementing multimedia or video presentations), etc. In addition to or alternatively to program code or instructions, a code module may also include various kinds of data, such as data used by the program code, data that describes or specifies display content (e.g., fonts, videos, animations, or other graphical content), data that describes or specifies audio content, etc.

One example of a runtime environment is a Java Runtime Environment, e.g., a software application configured to manage the execution of Java™ code modules. The Java™ code modules may be any modules or components that include Java™ program code, such as bytecode compiled for execution on a Java™ virtual machine or text code written in the Java™ programming language.

Another example of a runtime environment is a web browser plug-in configured to display multimedia presentations in a web browser application. In this case the code modules processed by the web browser plug-in may be modules that include multimedia presentation code (e.g., code written according to a particular specification for implementing multimedia or video presentations).

Another example of a runtime environment is an application or plug-in configured to provide graphically interactive applications, e.g., by processing code modules that have program code defining the functionality of the graphically interactive applications. The graphically interactive applications may display a graphical user interface (which may in some embodiments include video, animation, or other multimedia content) and may use user input provided by the user via one or more input devices.

FIG. 1 illustrates a plurality of user computer systems 60. (It is noted that throughout this disclosure, drawing features identified by the same reference number followed by a letter (e.g., user computer systems 60A, 60B, and 60C) may be collectively referred to by that reference number alone (e.g., user computer systems 60) where appropriate.) A runtime environment 110 has been installed on each of the user computer systems 60. For example, the runtime environment 110 may have been downloaded to each user computer system 60 from a server computer system 40. The server computer system 40 may be provided by a software vendor or organization that develops the runtime environment 110. After the runtime environment 110 has been installed, a user computer system 60 can then download code modules for processing by the runtime environment 110. The code modules may be provided by various third-party systems 30, e.g., from third-party websites, cloud services, module libraries, etc.

The server computer system 40 may also be configured to provide updates for the runtime environment 110. For example, the software vendor or organization that develops the runtime environment 110 may periodically create new versions of the runtime environment 110 and upload them to the server computer system 40.

In various embodiments the computer systems shown in FIG. 1 may be interconnected in any of various ways by a network 84. The network 84 may include any type of network or combination of networks. For example, the network 84 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. The computer systems may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11, among others.

Although only three user computer systems 60 are shown in FIG. 1, in various embodiments there may be any number of user computer systems 60, e.g., hundreds or thousands. In some embodiments the runtime environment 110 may be commonly used by members of the general public and may be installed on a large percentage of home or business computer systems. Since different versions of the runtime environment 110 are provided over time, different versions of the runtime environment 110 may be installed on different user computer systems 60 at any given time, e.g., since some users may elect to continue using their existing version of the runtime environment 110 instead of upgrading it when new versions become available. (The decision to not upgrade may leave the user vulnerable to malicious code modules. The runtime environment may include features to address this problem, as described in detail below.)

The server computer system 40 may include any number of physical computer systems or nodes coupled to the network 84. For example, to support a large user base, the server computer system 40 may include multiple computers or nodes which may possibly be geographically distributed so that user computer systems in different locations can contact a server that is relatively close.

Figure 2:
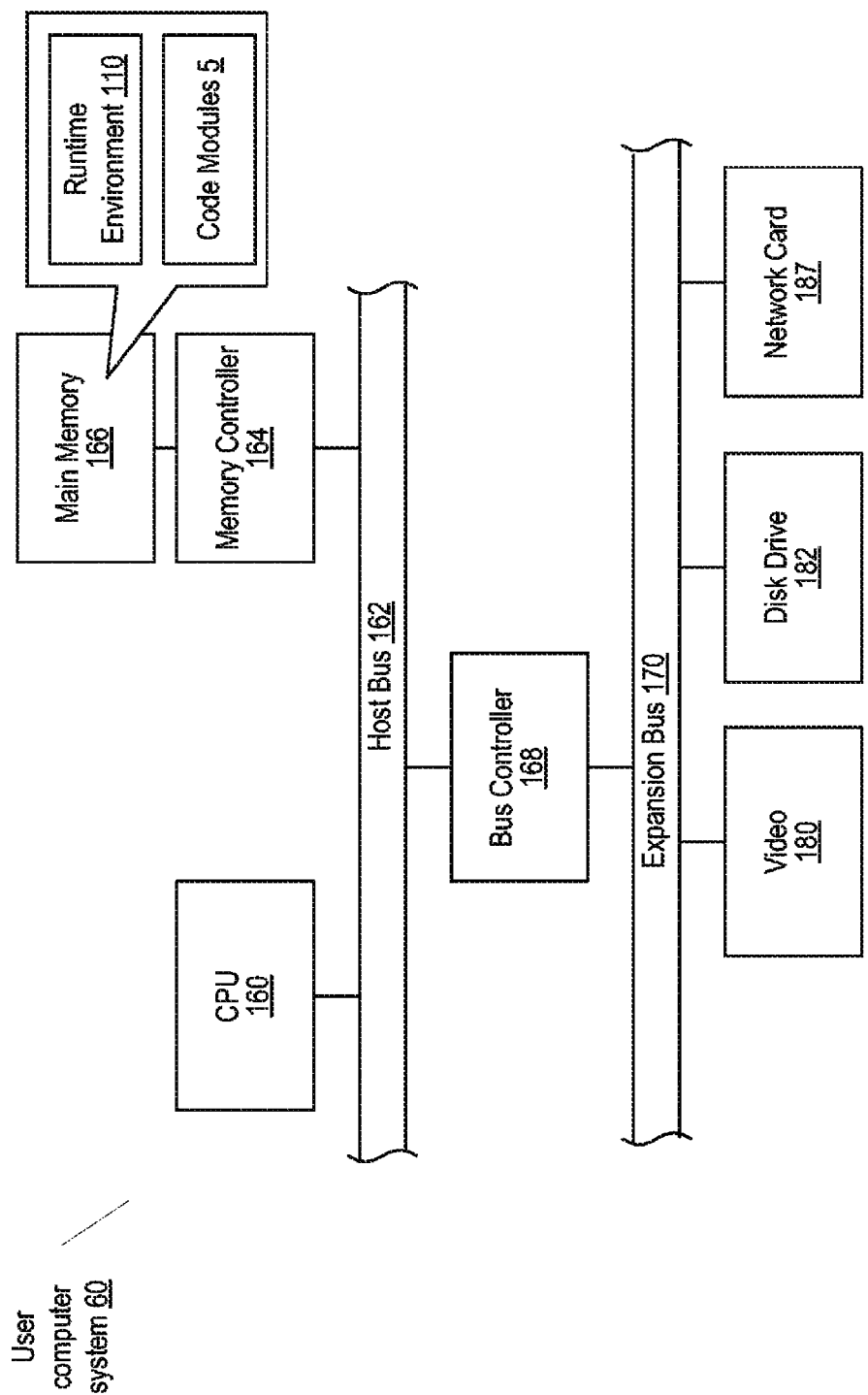
FIG. 2 illustrates one embodiment of a user computer system in more detail.

FIG. 2 illustrates one embodiment of a user computer system 60 in more detail. In general, each user computer system 60 may include any kind of computing device(s), such as one or more personal computer systems (PC), tablet computers, phone devices, workstations, network appliances, or other computing devices or combinations of devices. In general, the term "computer system" is broadly defined to encompass any device (or combination of devices) having at least one processor that executes instructions from one or more storage mediums. FIG. 2 illustrates a representative PC embodiment. Elements of a computer not necessary to understand the present description have been omitted for simplicity.

The user computer system 60 may include at least one central processing unit or CPU (processor) 160 which may be coupled to a processor or host bus 162. The processor 160 may be any of various types. For example, in some embodiments, the processor 160 may be compatible with the x86 architecture, while in other embodiments the processor 160 may be compatible with the SPARC™ family of processors. Also, in some embodiments the user computer system 60 may include multiple processors 160.

The user computer system 60 may also include memory 166 in which program instructions implementing the runtime environment 110 are stored. One or more code modules 5 may also be stored in the memory 166. When executed by the CPU 160, the program instructions of the runtime environment 110 may execute or process the code modules 5.

In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the backup server computer system 100. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, and a network card or device 187 that enables the user computer system 60 to send and receive information over the network 84.

A disk drive 182 may also be coupled to the expansion or input/output bus 170. The disk drive 182 may store instructions and data that implement the runtime environment 110 and the code modules 5, e.g., prior to being loaded into the memory 166. In other embodiments the runtime environment 110 and code modules 5 may be stored across multiple disk drives, or may be stored on another kind of storage device other than a disk drive. Examples of other kinds of storage devices include solid state drives, optical drives, tape drives, etc. The storage device(s) on which the information is stored may be included in or coupled to the user computer system 60 in any of various ways, e.g., via an input/output bus, via a network, via a wireless connection, etc.

In some embodiments the server computer system 40 may include similar components as those illustrated in FIG. 2. However, rather than executing the runtime environment 110, the server computer system 40 may execute server-side update manager software configured to communicate with the user computer systems 60 to allow the runtime environment 110 to be downloaded by the user computer systems 60.

Figure 3:
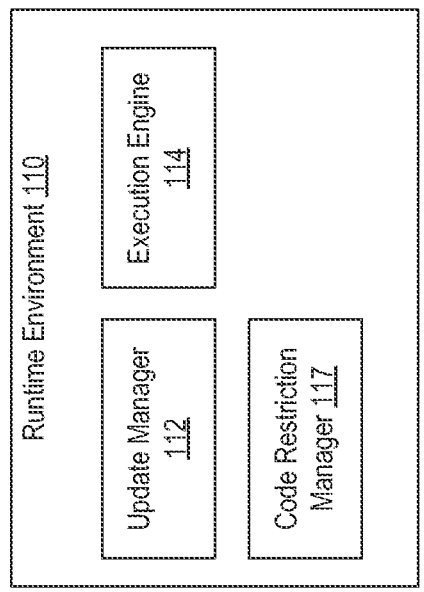
FIG. 3 illustrates components of the runtime environment according to some embodiments.

FIG. 3 illustrates components of the runtime environment 110 according to some embodiments. The runtime environment may include an execution engine 114 configured to execute, run, or process the code modules. The runtime environment may also include an update manager 112. The update manager 112 may be configured to manage the update process for keeping the runtime environment up to date as new versions become available on the server computer system 40. The runtime environment may also include a code restriction manager 117, which is described below. In various embodiments the runtime environment 110 may be implemented with any desired software architecture. The execution engine 114, update manager 112, and code restriction manager 117 may or may not be implemented as separate components or modules in the runtime environment 110.

Figure 4:
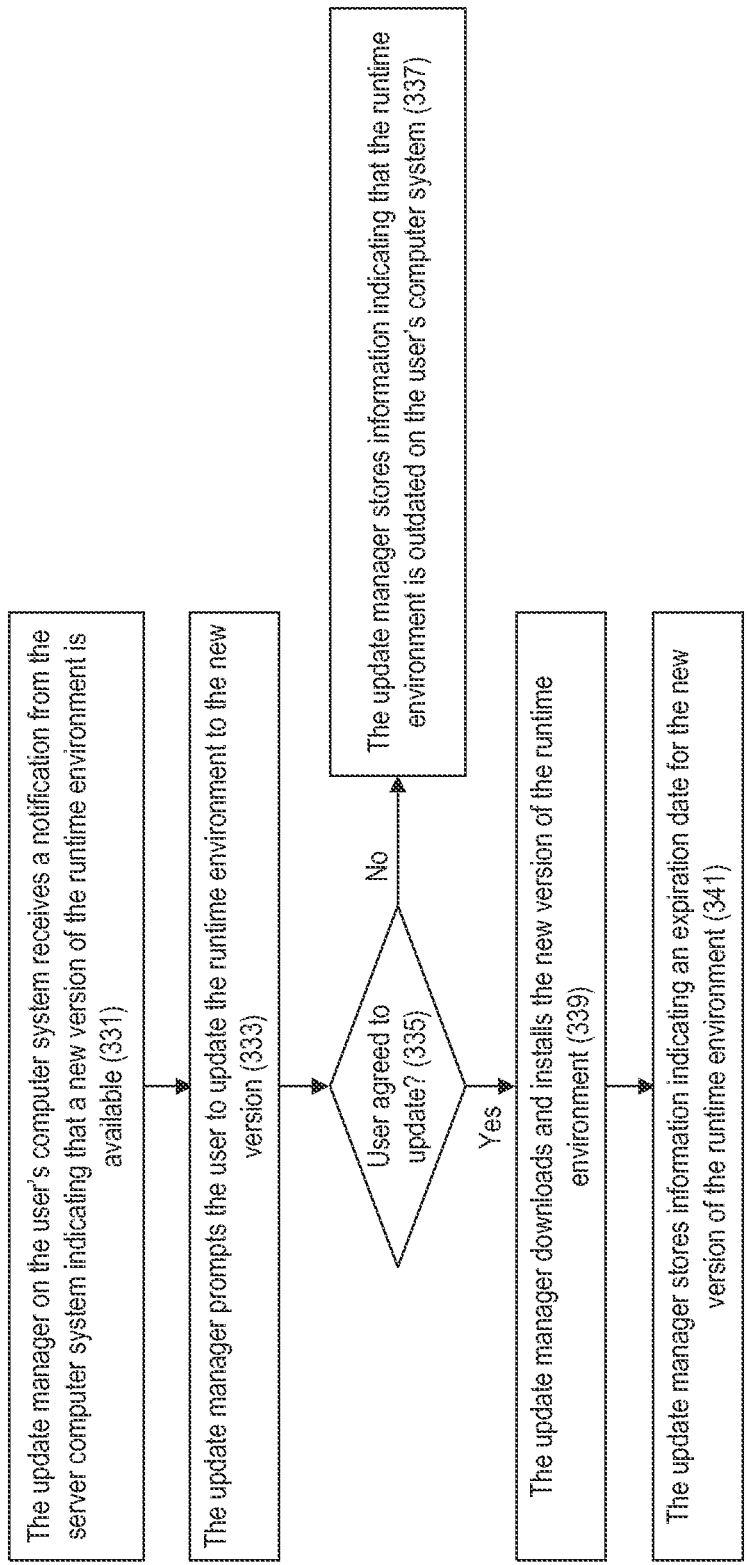
FIG. 4 is a flowchart diagram illustrating one embodiment of a method that may be implemented by an update manager executing on a user computer system.

FIG. 4 is a flowchart diagram illustrating one embodiment of a method that may be implemented by the update manager 112 which executes on a given user computer system 60. As indicated in block 331, the update manager 112 may receive a notification from the server computer system 40 indicating that a new version of the runtime environment 110 is available. The update manager 112 may receive the notification in various ways. For example, in some embodiments the update manager 112 may be configured to contact the server computer system 40 at various times to query whether a new version of the runtime environment 110 is available, e.g., at the startup of the user computer system 60, and/or when the runtime environment 110 is launched, and/or at periodic intervals. In response to the query, the server computer system 40 may return information indicating whether a new version is available. In other embodiments the server computer system 40 may be configured to initiate the communication with the update manager 112 to send a message indicating that a new version is available, e.g., according to a push model of communication.

In response to receiving the notification indicating that the new version of the runtime environment 110 is available, the update manager 112 may prompt the user to update the runtime environment to the new version, as indicated in block 333. For example, the update manager may display information on the display device of the user computer system 60 informing the user that the new version is available and requesting input indicating whether or not the user wants to update the runtime environment 110 to the new version.

As indicated in block 337, if the user does not agree to update the runtime environment 110 to the new version when prompted, the update manager 112 may store information indicating that the runtime environment 110 is outdated on the user's computer system 60. As described below, the code restriction manager 117 may inhibit some code modules from being processed by the execution engine 114 if the runtime environment 110 is outdated.

If the user agrees to update the runtime environment 110 to the new version when prompted, the update manager 112 may download and install the new version of the runtime environment, as indicated in block 339. In some embodiments the update manager may also store information indicating an expiration date for the new version of the runtime environment, as indicated in block 341. The expiration date is described below.

Figure 5:
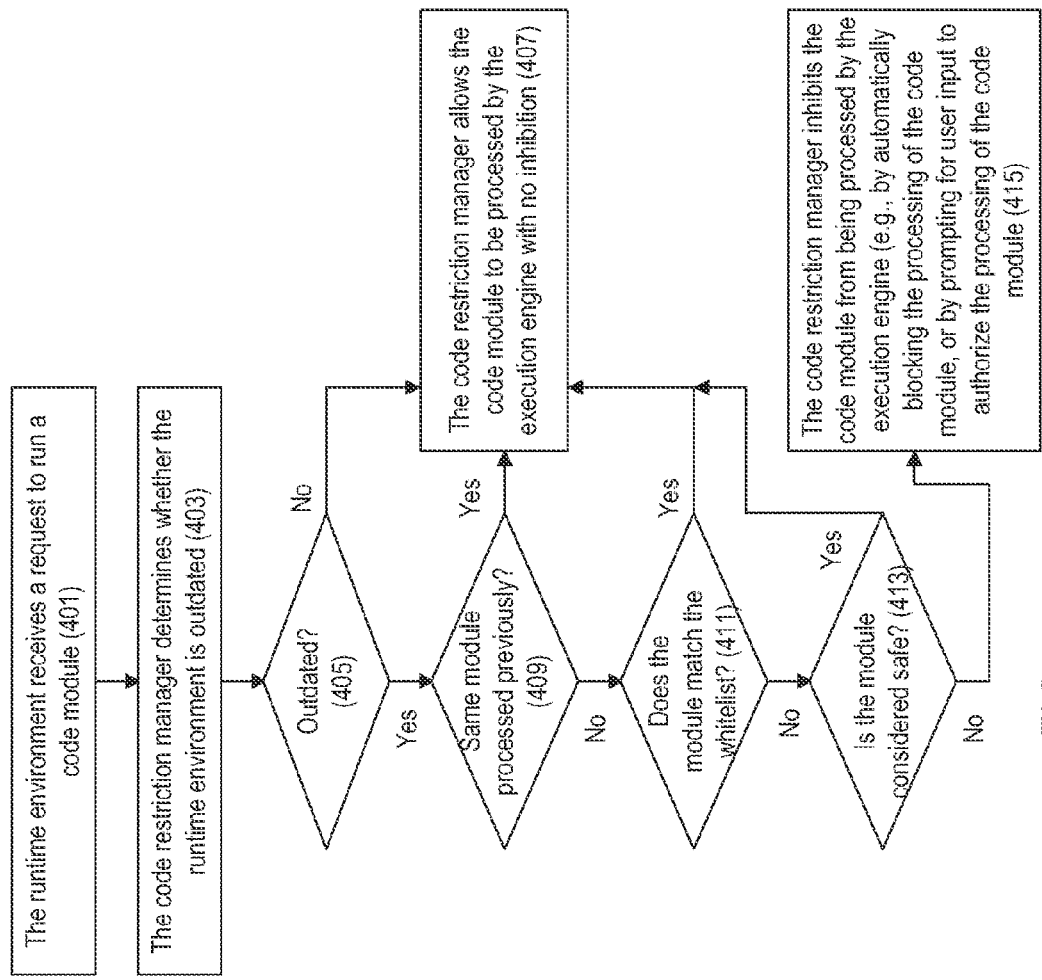
FIG. 5 is a flowchart diagram illustrating one embodiment of a method for inhibiting some code modules from being processed by the runtime environment.

FIG. 5 is a flowchart diagram illustrating one embodiment of a method for inhibiting some code modules from being processed by the execution engine 114 of the runtime environment 110. In alternative embodiments, various function blocks shown in the flowchart may be combined, omitted, modified, or performed in different orders.

As described above, a user can choose to not upgrade the runtime environment 110 to a new version when prompted to do so. However, since the new version of the runtime environment 110 may fix security vulnerabilities, the user may be taking a security risk if the user continues to use the older version of the runtime environment 110 without updating to the new version. The security risk may be especially significant if the user attempts to download and run new code modules, e.g., code modules that had not been previously downloaded and processed by the runtime environment 110 prior to the time when the new version of the runtime environment 110 became available. When a new security vulnerability is found, the software vendor/organization that develops the runtime environment 110 may move quickly to provide a new version of the runtime environment 110 to fix it. However, the security vulnerability is often known not only to the vendor of the runtime environment 110, but may also be publicized in online communities frequented by writers of malicious software. Since these writers know that a large percentage of users do not keep the software on their computer systems up to date, once they find out about a new security vulnerability, they may write new code modules that attempt to exploit the security vulnerability which exists in older versions of the runtime environment 110. It may thus be desirable to inhibit new code modules from being processed by the execution engine 114.

On the other hand, known code modules that had already been downloaded and processed by the runtime environment 110 prior to the time when the new version of the runtime environment 110 became available may be considered to be relatively safe and unlikely to contain malicious code exploiting the particular security vulnerabilities that are fixed by the new version of the runtime environment 110. It may thus be desirable to allow these known code modules to continue being processed by the execution engine 114.

Referring now to the flowchart of FIG. 5, the runtime environment 110 on a particular user computer system 60 may receive a request to run or process a particular code module, as indicated in block 401. For example, the user may launch or access an application that uses the code module, which causes the runtime environment 110 to receive the request to run or process the code module.

As indicated in block 403, the code restriction manager 117 of the runtime environment 110 may determine whether the runtime environment 110 is outdated. In some embodiments the code restriction manager 117 may determine whether the runtime environment 110 is outdated by determining whether the version of the runtime environment 110 installed on the user computer system 60 is the most recent version. If not then the code restriction manager 117 may consider the runtime environment 110 to be outdated. As described above, if the user chooses not to update the runtime environment 110 when prompted to do so, the update manager 112 may store information indicating that the runtime environment 110 is outdated. Thus, in some embodiments the code restriction manager 117 may check whether such information has been stored by the update manager 112 in order to determine whether or not the runtime environment 110 is outdated.

The code restriction manager 117 may also consider the runtime environment 110 to be outdated if an expiration date of the runtime environment 110 has passed. As mentioned above, when a particular version of the runtime environment 110 is installed on the user computer system 60, the update manager 112 may store information indicating an expiration date for this version. The expiration date may be set by the software vendor or organization that develops the runtime environment 110, e.g., based on their expectations of how often new versions of the runtime environment 110 will be released. For example, if the vendor expects to release new versions approximately once every four months then the expiration date may be set to somewhat longer, e.g., six months from the date when it first becomes available. If the expiration date is reached and the update manager 112 still has not received a notification from the server computer system 40 that a new version of the runtime environment 110 is available then this may indicate a problem in the notification process, and the code restriction manager 117 may consider the runtime environment 110 to be outdated. In some embodiments, if the expiration date is approaching and the vendor sees that a new version will not be released before the date arrives then the vendor may configure the server computer system 40 to notify the user computer systems 60 to extend the expiration date for the latest version of the runtime environment 110.

As indicated in blocks 405 and 407, if the code restriction manager 117 determines that the runtime environment 110 is not outdated then the code restriction manager 117 may allow the code module to be processed by the execution engine with no inhibition, e.g., with no additional inhibitions or restrictions beyond those (if any) that would be placed on the processing of a code module in a conventional runtime environment. Thus, if the user computer system 60 is up to date with the latest version of the runtime environment 110 then the code restriction manager 117 may not need to perform any further checks or safeguards regarding the code module before allowing it to be processed by the runtime environment 110, e.g., since in this case it may not matter whether the code module is a new one or an old one that has already been processed by the runtime environment 110.

If the code restriction manager 117 determines that the runtime environment 110 is outdated then the code restriction manager 117 may perform further checks in order to determine whether the processing of the code module should be inhibited. In particular, the code restriction manager 117 may determine whether the code module is a code module that has been previously processed or executed by the execution engine 114, as indicated in block 409. If so, then the code restriction manager 117 may allow the code module to be processed by the execution engine, as indicated by the "Yes" leg from block 409.

In various embodiments the code restriction manager 117 may use various techniques to determine whether the code module is one that has been previously processed by the execution engine 114. For example, in some embodiments the code restriction manager 117 may check whether the code module was stored in a cache associated with the runtime environment prior to the runtime environment becoming outdated. In other embodiments the code restriction manager 117 may check whether the code module has a checksum or other identifier that is identical to or equivalent to an identifier of a code module previously processed by the runtime environment. For example, the runtime environment 110 may keep track of the checksums of code modules that are processed by the runtime environment, and the code restriction manager 117 may check whether a checksum of the code module in question is listed in the checksum tracking information. In other embodiments the code restriction manager 117 may check whether the code module was downloaded from a location identical to a location from which a code module previously processed by the runtime environment was downloaded. For example, the runtime environment 110 may keep track of the locations from which code modules processed by the runtime environment are downloaded, and the code restriction manager 117 may check whether the location of the code module in question is listed in the download location information. If one or more of these conditions are true then the code restriction manager 117 may consider the code module to be a known or safe code module that should be allowed to be processed by the execution engine 114.

In some embodiments the runtime environment 110 may allow the user (or an administrator of the user's computer system) to define whitelist information that specifies certain code modules which should be allowed to be processed regardless of whether or not the runtime environment is up to date with the latest version. For example, the user may specify one or more characteristics of "safe" code modules which are stored in the whitelist information. As indicated in block 411, the code restriction manager 117 may check the code module to see if its characteristics match those specified in the whitelist information. If so then the code restriction manager 117 may consider the code module to be a known or safe code module that should be allowed to be processed by the execution engine 114.

In various embodiments the runtime environment 110 may enable the user to specify any of various kinds of code module characteristics in the whitelist information. For example, in some embodiments the user may be able to specify location information, such as a particular Internet domain, IP address range, etc. If the download location information for the code module matches the location information in the whitelist then the code restriction manager 117 may consider the code module to be a known or safe code module. In other embodiments the user may be able to specify information indicating one or more digital signatures for specific persons or software vendors. If the code module is digitally signed with a digital signature specified in the whitelist then the code restriction manager 117 may consider the code module to be a known or safe code module. In other embodiments the user may be able to specify information on the whitelist to designate individual code modules or applications as being safe. For example, the user may add checksums or identifiers to the whitelist that identify specific code modules which the user wants to be able to run.

In some embodiments, if the code module did not match the whitelist characteristics then the code restriction manager 117 may perform a further check by analyzing the actual functionality of the code module to attempt to determine whether the code module is safe for the outdated runtime environment to run. For example, the code restriction manager 117 may analyze the particular operations or programmatic calls performed by the code module. In some instances, if the particular operations performed by the code module are restricted to a certain subset of operations then the code restriction manager 117 may consider the code module to be safe. Conversely, the code restriction manager 117 may also determine whether the code module performs one or more particular operations or programmatic calls considered to be security risks. If so then the code restriction manager 117 may consider the code module to be unsafe. Examples of operations that may be considered security risks in some embodiments include operations that access a network or local disk drive. Other examples of code modules that may be considered unsafe to run by an outdated runtime environment in some embodiments include: 1) code modules that includes native code (e.g., program instructions compiled for execution by a physical processor); 2) code modules that perform interactive data communications with servers (e.g., since the data may not be from a trusted source); 3) media files.

In further embodiments of block 413, the code restriction manager 117 may cause the code module to be scanned by a virus or malware checker. If a virus or other malware is found then the code module may be considered unsafe.

If the runtime environment is outdated and the code module does not pass any of the checks shown in blocks 409, 411, or 413 then the code restriction manager 117 may inhibit the code module from being processed by the execution engine. In various embodiments, inhibiting the code module from being processed may include performing any action to block or delay the code module from being processed and/or performing any action that requires a response from the user to authorize the code module to be processed. In some embodiments the code restriction manager 117 may automatically block the code module from being processed from being processed. For example, the code restriction manager 117 may display information indicating to the user that the code module was blocked from processing without giving the user an option to override the block. (The user may however be able to change the security settings of the runtime environment to prevent the code module from being blocked, and then try to execute the code module again.) In other embodiments the code restriction manager 117 may display a warning to the user indicating that the runtime environment is outdated and that processing the code module may present a security risk, but still giving the user an option to authorize the code module to be processed, e.g., by clicking a button. In some embodiments, if the user authorizes the code module to be processed, the code restriction manager 117 may be configured to remember the user's choice so that the user will not be warned again in the future for the same code module.

The type of inhibition performed by the code restriction manager 117 may vary for different code modules. For example, as mentioned above, in some embodiments the code restriction manager 117 may cause the code module to be scanned by a virus or malware checker. In some embodiments, if a virus is found then the code module may be blocked without giving the user the ability to override the block. On the other hand, if no particular security risks were detected in the code module then the user may be allowed to authorize the code module to be processed. In other embodiments, the user may still be allowed to authorize the code module to be processed even if the system believes that a virus has been found, but a stronger warning than usual may first be displayed to the user, or the user may be required to perform additional steps for the authorization.

In some embodiments, if the runtime environment is outdated then the code restriction manager may enable the runtime environment to process some of the code in the code module, but may cause the runtime environment to block other code in the code module from being processed. For example, in some embodiments, if the code module includes executable code that performs operations considered to be security risks then that code may be blocked from execution, but other code that performs operations considered to be safe may be allowed to execute. As another example, if the code module implements a graphically interactive applications that uses user input then the user input may be disallowed, but the code module may still be allowed to run and display the graphical content of the application. In some embodiments, certain types of user input such as scrolling and zooming may be allowed, and other types of user input may be disallowed.

In further embodiments the runtime environment 110 may also allow the user to define blacklist information that specifies characteristics of certain code modules which should be inhibited from being processed if the runtime environment 110 is outdated, even if the code module passes the other checks. In various embodiments the users may be able to specify any of various kinds of characteristics in the blacklist information, such as location information, digital signatures, etc. In some embodiments, if the properties of the code module match the properties specified in the blacklist information and the runtime environment is outdated then the code restriction manager 117 may inhibit the code module from being processed, even if the same code module was previously processed by the runtime environment for example. The ability to define blacklist information may be useful to reduce the risk from security threats such as particular code modules known to include malicious code, or code modules downloaded from websites or other network sources known to contain malware.

In some embodiments the runtime environment may be configured to automatically receive the blacklist information from a source other than the user or the user's system administrators. For example, the blacklist information may be automatically provided by the vendor of the runtime environment or by a third-party security company. New blacklist information may be automatically downloaded by or pushed to the runtime environment as new security threats are discovered. The runtime environment may continue to update the blacklist information even if the runtime environment is outdated.

Thus, various embodiments of the method of FIG. 5 may provide safeguards against the execution of new code modules by an outdated runtime environment, while still enabling older known code modules to be executed without inhibition. This may encourage users who download new code modules to allow the runtime environment 110 to update itself to the latest version, thus reducing their security risk. On the other hand, users who typically use the same applications whose code modules do not often change may still be able to continue to use these applications without needing to update to the latest version of the runtime environment. For example, if a particular user does not often download new code modules then this user may be able to skip one or more versions of the runtime environment altogether before eventually needing to update the runtime environment at some future point in order to be able to execute a new code module.

Figure 6:
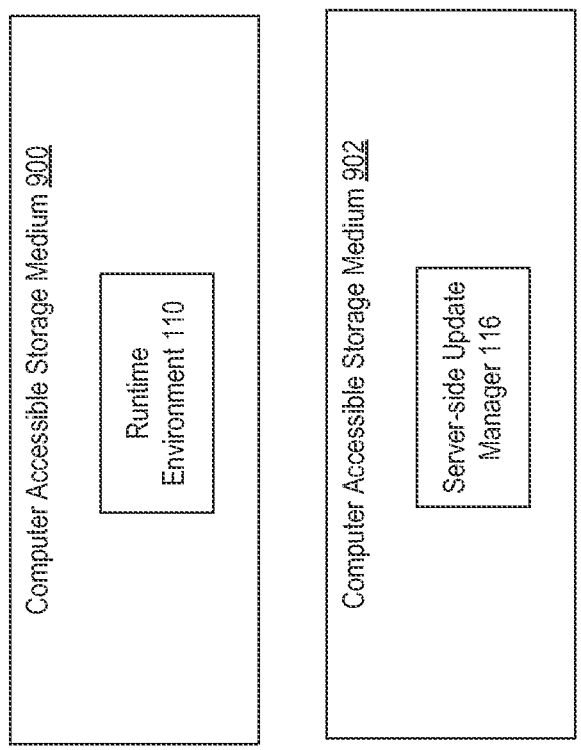
FIG. 6 is a block diagram of computer accessible storage mediums.

Turning now to FIG. 6, a block diagram of computer accessible storage mediums 900 and 902 is shown. The computer accessible storage medium 900 may store program instructions of the runtime environment 110, e.g., program instructions that implement the functionality of one or more of the update manager 112, execution environment 114, and/or code restriction manager 117. The program instructions may be executable by one or more processors to implement various functions described above. Generally speaking, various embodiments of a computer accessible storage medium are contemplated for storing any set of instructions which, when executed, implement a portion or all of the functions described above.

The computer accessible storage medium 902 may store program instructions of the server-side update manager 116, e.g., program instructions that implement functionality performed by the server computer system 40 such as described above.

A computer accessible storage medium may include any storage media accessible by one or more computers during use to provide instructions and/or data to the computer(s). For example, a computer accessible storage medium may include storage media such as magnetic or optical media, e.g., one or more disks (fixed or removable), tapes, CD-ROMs, DVD-ROMs, CD-Rs, CD-RWs, DVD-Rs, DVD-RWs, or Blu-Ray disks. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory, computer-readable storage medium storing program instructions executable by one or more processors to:
   detect that a runtime environment installed on a computer system is outdated, wherein the runtime environment is configured to manage execution of one or more code modules;
   in response to determining that a first code module was previously processed by the runtime environment prior to the runtime environment becoming outdated, allow the first code module to be processed by the runtime environment; and
   in response to determining that a second code module has not been previously processed by the runtime environment prior to the runtime environment becoming outdated, inhibit the second code module from being processed by the runtime environment.

2. The non-transitory, computer-readable storage medium of claim 1,
   wherein the program instructions are executable by the one or more processors to inhibit the second code module from being processed by the runtime environment by prompting for user input to authorize the second code module to be processed.

3. The non-transitory, computer-readable storage medium of claim 1,
   wherein the program instructions are executable by the one or more processors to inhibit the second code module from being processed by the runtime environment by automatically blocking the second code module from being processed.

4. The non-transitory, computer-readable storage medium of claim 1,
   wherein the program instructions are executable by the one or more processors to detect that the runtime environment installed on the computer system is outdated by determining that a newer version of the runtime environment is available.

5. The non-transitory, computer-readable storage medium of claim 1,
wherein the program instructions are executable by the one or more processors to detect that the runtime environment installed on the computer system is outdated by determining that an expiration date of the runtime environment installed on the computer system has passed.

6. The non-transitory, computer-readable storage medium of claim 1,
wherein in performing said determining that the first code module was previously processed by the runtime environment prior to the runtime environment becoming outdated, the program instructions are executable by the one or more processors to perform one or more of:
determining that the first code module was stored in a cache associated with the runtime environment prior to the runtime environment becoming outdated;
determining that the first code module has an identifier equivalent to an identifier of a code module previously processed by the runtime environment;
determining that the first code module was downloaded from a location identical to a location from which a code module previously processed by the runtime environment was downloaded.

7. The non-transitory, computer-readable storage medium of claim 1, wherein the program instructions are further executable by the one or more processors to:
in response to determining that a third code module which has not been previously processed by the runtime environment has one or more attributes designating the third code module as a safe code module, allow the runtime environment to process the third code module without inhibiting the processing of the third code module.

8. The non-transitory, computer-readable storage medium of claim 1,
wherein the program instructions are further executable by the one or more processors to analyze the second code module to determine whether the second code module is configured to perform one or more operations indicated as being security risks;
wherein the program instructions are executable by the one or more processors to inhibit the second code module from being processed by the runtime environment in response to both determining that the second code module has not been previously processed by the runtime environment prior to the runtime environment becoming outdated and determining that the second code module is configured to perform one or more operations indicated as being security risks.

9. The non-transitory, computer-readable storage medium of claim 1, wherein the runtime environment is configured to execute bytecode for a virtual machine, wherein the first code module and the second code module include bytecode for the virtual machine.

10. The non-transitory, computer-readable storage medium of claim 1, wherein the runtime environment is configured to manage execution of native code compiled for a physical processor, wherein the first code module and the second code module include native code compiled for the physical processor.

11. The non-transitory, computer-readable storage medium of claim 1, wherein the runtime environment is configured to process markup language code, wherein the first code module and the second code module include markup language code.

12. The non-transitory, computer-readable storage medium of claim 1, wherein the runtime environment is configured to process code modules implementing multimedia content, wherein the first code module and the second code module include information implementing multimedia content.

13. The non-transitory, computer-readable storage medium of claim 1, wherein the runtime environment is configured to process code modules implementing graphically interactive applications, wherein the first code module and the second code module include information implementing a graphical user interface configured to receive user input affecting the operation of a graphically interactive application.

14. A method comprising:
detecting that a runtime environment installed on a computer system is outdated, wherein the runtime environment is configured to manage execution of one or more code modules;
in response to determining that a first code module was previously processed by the runtime environment prior to the runtime environment becoming outdated, allowing the first code module to be processed by the runtime environment; and
in response to determining that a second code module has not been previously processed by the runtime environment prior to the runtime environment becoming outdated, inhibiting the second code module from being processed by the runtime environment.

15. The method of claim 14,
wherein said inhibiting the second code module from being processed by the runtime environment comprises one or more of:
automatically blocking the second code module from being processed; or
prompting for user input to authorize second code module to be processed.

16. The method of claim 14,
wherein said detecting that the runtime environment installed on the computer system is outdated comprises determining that a newer version of the runtime environment is available.

17. The method of claim 14,
wherein the runtime environment is configured to execute bytecode for a virtual machine, wherein the first code module and the second code module include bytecode for the virtual machine.

18. A system comprising:
one or more processors; and
memory storing program instructions executable by the one or more processors to:
detect that a runtime environment installed on a computer system is outdated, wherein the runtime environment is configured to manage execution of one or more code modules;
in response to determining that a first code module was previously processed by the runtime environment prior to the runtime environment becoming outdated, allow the first code module to be processed by the runtime environment; and
in response to determining that a second code module has not been previously processed by the runtime environment prior to the runtime environment becoming outdated, inhibit the second code module from being processed by the runtime environment.

\* \* \* \* \*

UNITED STATES PATENT AND TRADEMARK OFFICE
CERTIFICATE OF CORRECTION

PATENT NO. : 8,881,291 B2
APPLICATION NO. : 13/626258
DATED : November 4, 2014
INVENTOR(S) : Roger S. Calnan, Jeannette Hung and Aurelio Garcia-Ribeyro It is certified that error appears in the above-identified patent and that said Letters Patent is hereby corrected as shown below:

Title page, item (71) should read as follows:
APPLICANT: ORACLE INTERNATIONAL CORPORATION

Signed and Sealed this
Thirteenth Day of October, 2015

Michelle K. Lee
*Director of the United States Patent and Trademark Office*